United States Patent Office 2,739,969
Patented Mar. 27, 1956

2,739,969

SUBSTITUTED ALKYL PIPERIDINES

Nathan Sperber and Domenick Papa, Bloomfield, N. J., assignors to Schering Corporation, Bloomfield, N. J., a corporation of New Jersey No Drawing. Application June 9, 1952,
Serial No. 292,572

10 Claims. (Cl. 260—293)

The present invention relates to a new group of compounds of significant pharmacological and physiological action. More particularly, the invention describes a series of substituted alkyl piperidines, their acid and quaternary salts, showing pronounced antispasmodic and parasympathetic blocking activity. The invention also describes intermediates for preparing these compounds, as well as processes.

The substituted alkyl piperidines of this invention may be represented by the general formula:

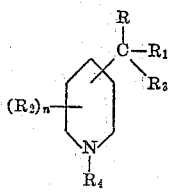

wherein R and $R_1$ are members of the group consisting of aryl, aralkyl, aralkenyl, cycloalkyl, cycloalkene, heterocyclic, alkyl and alkene groups, $R_2$ is a lower alkyl group, $R_3$ is selected from the group consisting of hydrogen, hydroxyl, alkoxyl or acyloxy or an additional bond to the piperidine ring, $n$ is an integer from 1–3 and $R_4$ is selected from the group consisting of hydrogen, lower alkyl groups and aralkyl groups. Representative of the groups R and $R_1$ are phenyl, benzyl, thienyl, pyridyl, pyrimidyl, thiazyl, furyl, cyclohexyl, cyclohexenyl propyl, isopropyl, butyl and others of these general types, as well as the chloride, bromide, dialkylamino, lower alkoxy and lower alkyl substitution products of the cyclic compounds.

Of particular utility for clinical purposes are the compounds of the general formula wherein $R_3$ is an additional bond to the piperidine ring, the moiety $R—C—R_1$ is in the 3-position with respect to the piperidine nitrogen and $R_2$ is in the 2- and/or 6-position with respect to the piperidine nitrogen.

The quaternary salts of the compounds of the present invention are prepared in the conventional manner by reacting the free base with an alkyl halide, aralkyl halide and an alkyl or aralkyl sulfate. For example, there may be used methyl iodide, ethyl chloride, isopropyl bromide, dimethyl sulfate, benzyl chloride, ethyl p-toluenesulfonate and other agents of these types. The acid addition salts include hydrochloride, sulfate, tartrate, maleate, citrate and other non-toxic salt-forming acids of these types.

In general, the compounds of the present invention may be prepared by several methods. The method of choice for the substances of the general formula wherein flexibility of the quantities R, $R_1$ and $R_2$ is desired, is illustrated by the following formulas:

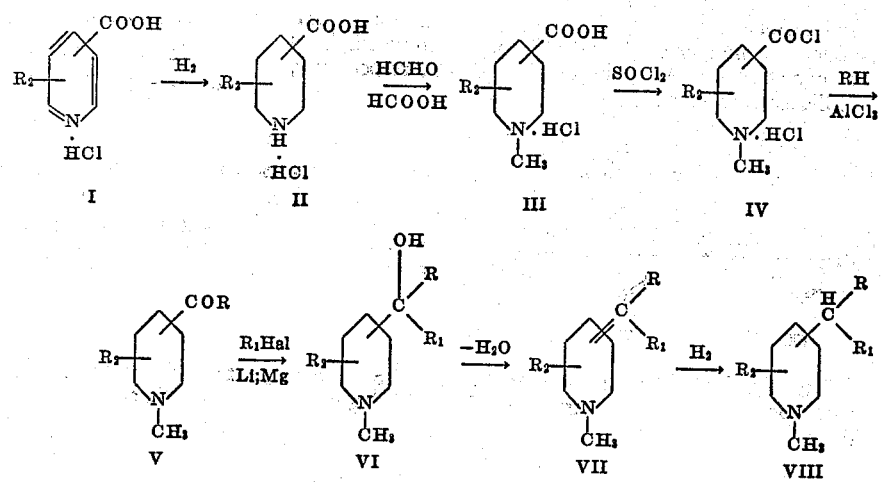

Alkylpiperidine carboxylic acids such as 2-methylisonicotinic, 6-methylnicotinic, 2,6-dimethylnicotinic, 6-isopropylnicotinic, etc., as such or in the form of their hydrochlorides are readily reducible to the corresponding piperidine carboxylic acids.

This reaction is carried out in a low pressure hydrogenator using platinum oxide catalyst or by high pressure hydrogenation using Raney nickel catalyst. Methylation of the piperidine compound proceeds smoothly by any of the known methods (for example, formic acid and formaldehyde) and subsequent treatment of the N-methyl compound with thionyl chloride gives the corresponding acid chloride. Reaction of the acid chloride by any of the usual Friedel-Crafts procedures with an aromatic compound, for example, benzene, thiophene, chlorobenzene, methoxybenzene, etc., yields the keto compounds of type V. Treatment of the latter substance with an organometallic derivative of a halogenated thiophene, pyridine, pyrimidine, thiazole, furan, cycloalkyl or alkyl compound yields the tertiary carbinols of formula VI. These substances are for the most part high-boiling liquids which can be readily recrystallized to white crystalline solid. Dehydration of the tertiary carbinols to the unsaturated compounds VII is carried out with agents such as thionyl chloride, phosphorous oxychloride, phosphorous tribromide, sulfuric acid, oxalic acid, hydrochloric acid, etc. The choice of reagents and reaction conditions for obtaining the unsaturated compounds of formula VII is determined by the nature of the quantities R and $R_1$. The methane derivatives of type VIII are obtained by reduction of the unsaturated compounds VII by known methods for the hydrogenation of ethylene compounds. Unlike the tertiary carbinols, the methane compounds are found in both solid and liquid form and are lower-boiling than the tertiary alcohols.

With the exception of the alkyl and cycloalkyl types, the piperidine compounds VIII can be made by the following alternate method which employs as intermediate the pyridine derivatives IX. The latter compounds can be obtained from the corresponding carbinols (J. A. C. S. 70, 4001 (1948); J. A. C. S. 71, 887 (1949)) by replacement of the hydroxyl group by halogen (thionyl chloride) followed by reductive dehalogenation using zinc and acetic acid or any one of several catalytic procedures. The pyridine compound, on oxidation with potassium permanganate, yields the keto compounds X (J. A. C. S. 72, 2722 (1950)) which are then transformed into the tertiary carbinols XI by the same procedures used for the conversion of V to VI. High pressure catalytic hydrogenation of XI simultaneously reduces the pyridine ring, dehydrates the resulting piperidine carbinols (XII) and saturates the newly formed double bond of XIII to yield the methane derivative XIV. Alkylation of the piperidine compound XIV is carried out by any of the known methods, for example, formic acid and formaldehyde, alkyl halides with alkali, etc. Compounds of the type of XII and XIII may also be alkylated to compounds of the type of VI and VII, respectively, in the same manner.

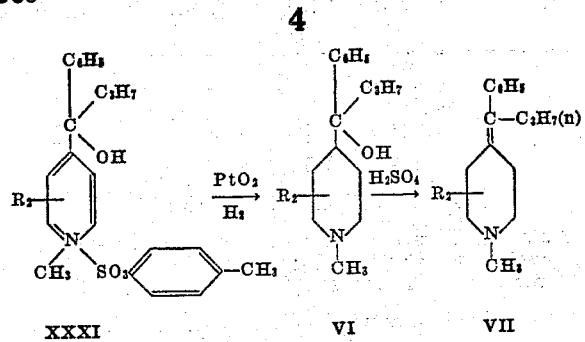

Using the N-alkylpiperidinecarboxylic acids III in the form of the ethyl or methyl esters in the conventional Grignard reaction with, e. g., an aryl, aralkyl, heterocyclic, cycloalkyl or alkyl magnesium halide, the compounds of the general formula are obtained wherein R and R₁ are the same. The reaction is illustrated by the

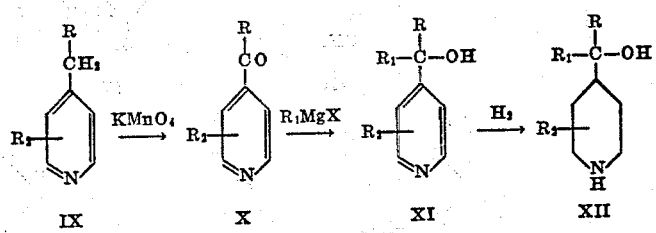

The piperidyl carbinols of type VI can also be prepared by the reactions illustrated by the following equations.

following equation for the diphenyl compound from isonipecotic acid:

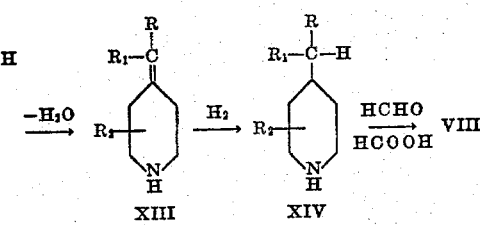

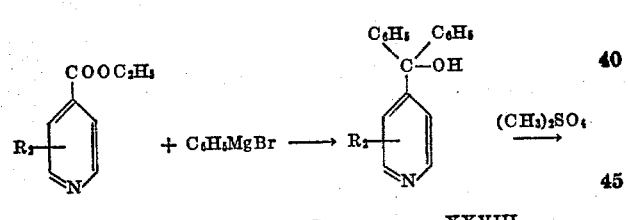

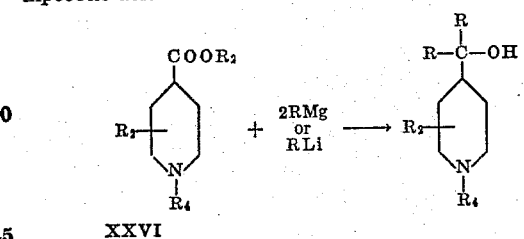

It is readily seen that this reaction yields the carbinols of type VI in one step from the ester of III. This method, as indicated, is, of necessity, limited to those compounds wherein R and R₁ are the same. However, in those cases, this procedure has considerable application in view of the number of Grignard reagents of R and R₁, which are readily available. In similar fashion, the corresponding 2- and 3-piperidinecarboxylic acid esters yield the 2- and 3-N-alkylpiperidine substituted carbinols.

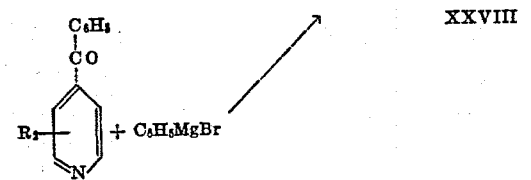

In general, the alkylpyridine or alkylpiperidinecarboxylic acids required for the new compounds of the present invention are not generally available. They may be made by the oxidation of alkylpyridines wherein the preferential oxidation of one alkyl group takes place. For example, on oxidizing 3-ethyl-6-methylpyridine, there is obtained the 6-methylnicotinic acid and by the oxidation of 2,4,6-trimethylpyridine, there can be obtained the 2,6-dimethylisonicotinic acid. Alternately, the alkylpyridine or alkylpiperidinecarboxylic acids can be made by cyclization reactions.

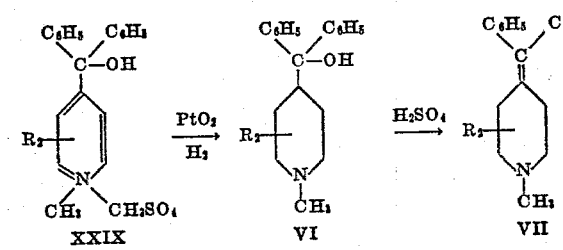

In the following equations, there are illustrated general methods which may be used for the synthesis of these acids. These syntheses are not limited to the specific substances shown, but can be varied to yield the appropriately substituted acids by the selection of the proper intermediates. For instance, in the following equations, in place of the methyl group in the final compounds, one can have ethyl, propyl, isopropyl or butyl by using the corresponding starting material in the initial step:

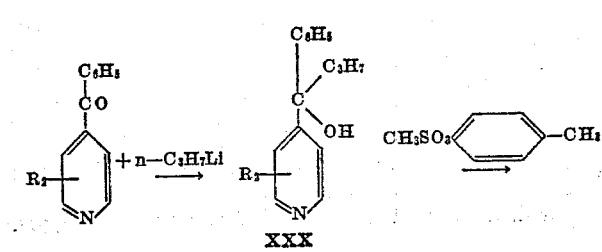

(1) 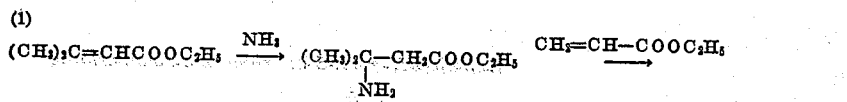

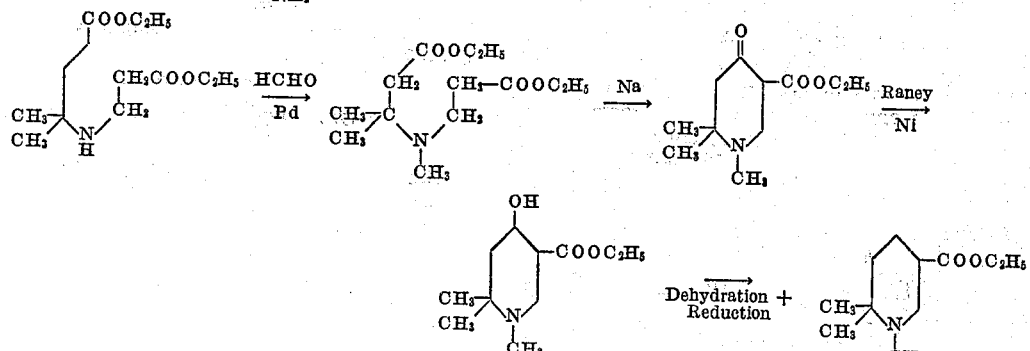

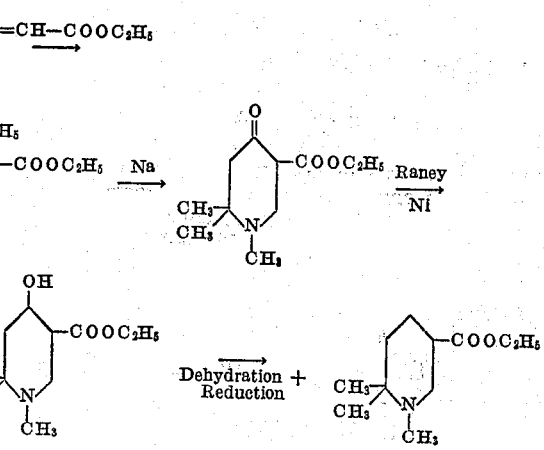

Substituting ethyl aceto acetate for ethyl acrylate in the above equation there is obtained the ethyl 2,6,6-trimethyl-N-methyl-nipecotate.

(2) 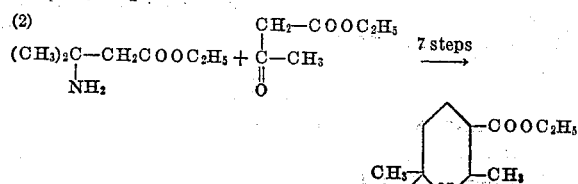

(3) 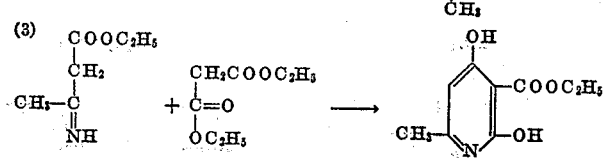

(4) 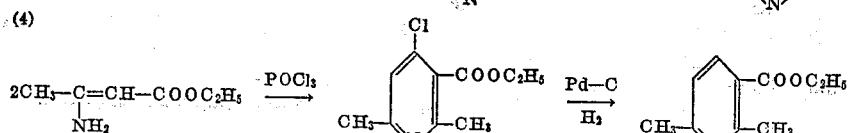

(5) 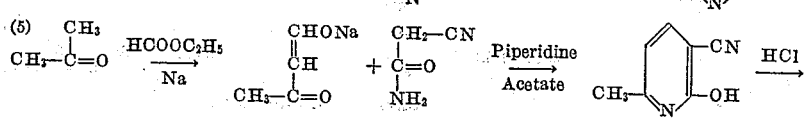

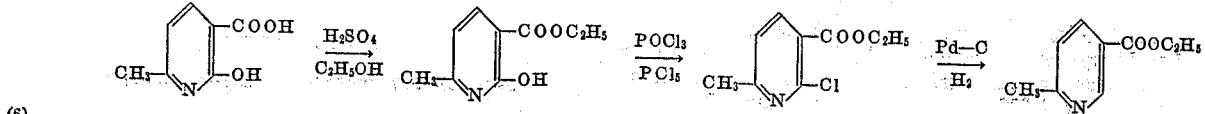

(6) 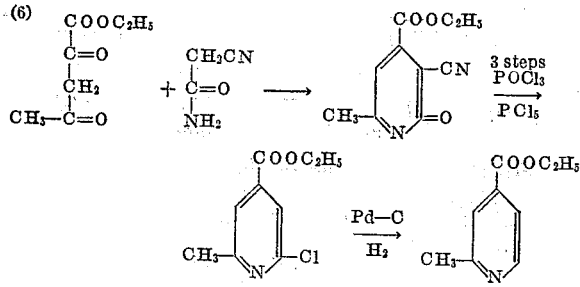

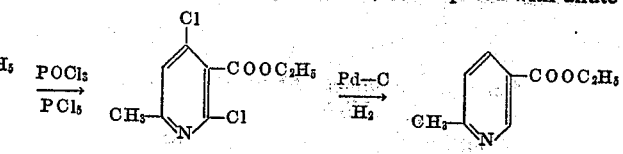

The invention is further described by the following examples which are presented only as illustrative compounds and methods and are not intended to limit the invention except as defined in the claims:

EXAMPLE I

*6-methyl-N-methyl-3-piperidyldiphenylcarbinol*

A solution of 33 g. of ethyl 6-methylnicotinate and 50 g. of methyl p-toluenesulfonate is heated on the steam bath for fifteen minutes. Dilution of the thick oil with benzene yields the quaternary salt as a white solid, M. P. 119–121° C. The crude ethyl 6-methyl-N-methylnicotinate p-toluenesulfonate is dissolved in absolute ethanol and reduced in a Parr apparatus with hydrogen and platinum oxide. The catalyst is filtered off, the filtrate concentrated in vacuo and the residue dissolved in water. The aqueous filtrate is made basic with potassium carbonate, the oily layer extracted with ether, the ether dried, concentrated and the residue, ethyl 6-methyl-N-methylnipecotate, fractionated, B. P. 94–96° C./9 mm. To a Grignard solution prepared from 12 g. of magnesium and 80 g. of bromobenzene, there is added 21 g. of ethyl 6-methyl-N-methylnipecotate. The reaction mixture is stirred and refluxed for ten hours, decomposed with dilute hydrochloric acid and the hydrochloride filtered. The hydrochloride is suspended in hot water, treated with 50% sodium hydroxide and the free base extracted with benzene. The benzene extracts are dried, concentrated and the oily residue solidifies upon cooling. The carbinol melts at 112–113° C.

EXAMPLE II

*6-methyl-N-methyl-3-piperidyldiphenylcarbinol hydrochloride*

A benzene solution of 6-methyl-N-methylpiperidyldiphenylcarbinol is saturated with hydrogen chloride until precipitation of the carbinol hydrochloride is completed. Recrystallization from alcohol yields the hydrochloride as a white crystalline solid.

EXAMPLE III

*6-methyl-N,N-dimethyl-3-piperidyldiphenylcarbinol iodide*

Refluxing a mixture of 6-methyl-N-methyl-3-piperidyldiphenylcarbinol with an excess of methyl iodide, there is obtained the quaternary salt of this example.

EXAMPLE IV

*6-methyl-N-methyl-3-benzhydrylidenepiperidine*

A mixture of 16 g. of 6-methyl-N-methyl-3-piperidyl-diphenylcarbinol and 200 ml. of 40–60% sulfuric acid is stirred and heated on the steam bath for ten hours. The solution is poured on ice, made basic with 50% sodium hydroxide and the oily layer is extracted with ether. The ether extracts are dried, concentrated and the residual oil is fractionated; B. P. 155–160° C./1.0 mm.

EXAMPLE V

*6-methyl-N-methyl-3-benzhydrylidenepiperidine hydrochloride*

From the free base of Example IV and hydrochloric acid, M. P. 246–247° C.

EXAMPLE VI

*6-methyl-N,N-dimethyl-3-benzhydrylidene-piperidinium iodide*

A solution of 8.5 g. of the free base of Example IV in methanol and an excess of methyl iodide is refluxed for fifteen minutes. Upon dilution with ether, a solid crystallizes, which melts at 204–205° C. after a recrystallization from methanol-ether.

EXAMPLE VII

*6-methyl-N-methyl-3-benzhydrylidenepiperidine citrate*

From the free base of Example IV and an alcoholic solution of citric acid.

EXAMPLE VIII

*6-methyl-N,N-dimethyl-3-benzhydrylidene-piperidinium bromide*

To a solution of 4.2 g. of the iodide of the previous example in methanol, there is added an equivalent amount of freshly prepared silver bromide. The mixture is refluxed and stirred for three hours, filtered and the filtrate concentrated. The crude solid is recrystallized from methanol-ether, M. P. 219–220° C. This compound can also be prepared by the direct reaction of methyl bromide and the free base.

EXAMPLE IX

*6-methyl-N-methyl-3-benzhydrylpiperidine*

A solution of one mole of 6-methyl-N-methyl-3-benzhydrylidenepiperidine in absolute alcohol is reduced with Raney nickel catalyst and hydrogen at an initial pressure of 1,500 lbs. and a temperature of 125° C. The catalyst is removed by filtration, the alcoholic solution concentrated in vacuo and the residue is distilled, B. P. 154–158° C./0.5 mm.; M. P. 108–109° C.

EXAMPLE X

*6-methyl-N-methyl-3-benzhydrylpiperidine hydrochloride*

From the base of Example IX and hydrochloric acid.

EXAMPLE XI

*6-methyl-N,N-dimethyl-3-benzhydrylpiperidinium iodide*

From the free base of Example IX with methyl iodide.

EXAMPLE XII

*6-methyl-N-ethyl-3-piperidyldiphenylcarbinol*

This compound is prepared by a method analogous to that described in Example I. Ethyl 6-methylnicotinate is quaternized with ethyl p-toluenesulfonate and the crude salt reduced with platinum oxide. Upon reaction of ethyl 6-methyl-N-ethylnipecotate with an ether solution of phenyllithium, there is obtained 6-methyl-N-ethyl-3-piperidyldiphenylcarbinol, M. P. 100–101° C.

EXAMPLE XIII

*6-methyl-N-ethyl-3-benzhydrylidenepiperidine*

Dehydration of the carbinol of Example XII with sulfuric acid as described in Example IV, B. P. 162–166° C./1–2 mm.

EXAMPLE XIV

*6-methyl-N-ethyl-N-methyl-3-benzhydrylidene-piperidinium iodide*

The free base of Example XIII with methyl iodide yields a semisolid quaternary which slowly crystallizes from ethanol.

EXAMPLE XV

*6-methyl-N-ethyl-3-benzhydrylpiperidine*

Reduction of the base of Example XIII by the method of Example IX, B. P. 156–160° C./1 mm.

EXAMPLE XVI

*6-methyl-N-isopropyl-3-piperidyldiphenylcarbinol*

From ethyl 6-methyl-N-isopropylnicotinate p-toluene-sulfonate by the procedure of Example I, M. P. 143–144° C.

EXAMPLE XVII

*6-methyl-N-isopropyl-3-benzhydrylidenepiperidine*

From the carbinol of Example XVI by the procedure of Example IV, B. P. 168–172° C./2 mm.

EXAMPLE XVIII

*6-methyl-N-isopropyl-3-benzhydrylidenepiperidine tartrate*

Equivalent quantities of tartaric acid and the free base of Example XVII in alcohol are refluxed for one hour. The mixture is cooled, diluted with dry ether and the tartrate then slowly crystallizes from this mixture.

EXAMPLE XIX

*6-n-propyl-N-methyl-3-piperidyldiphenylcarbinol*

Ethyl 6-n-propylnicotinate (Monatsh., 81, 83 (1950)) is reacted with methyl p-toluenesulfonate and the quaternary salt reduced with platinum oxide in ethanol. The resulting 6-n-propyl-N-methylnipecotate is then reacted with phenyl-magnesium bromide in either according to the procedure of Example I.

EXAMPLE XX

*6-n-propyl-N-methyl-3-benzhydrylidenepiperidine*

From the carbinol of the previous example by the procedure of Example IV, B. P. 170–175° C./2 mm.

EXAMPLE XXI

*6-n-propyl-N-isopropyl-N-methyl-3-benzhydrylidine-piperidinium bromide*

From the free amine of the previous example and isopropyl bromide, this quaternary is obtained as a white crystalline solid after recrystallization from alcohol-ether.

EXAMPLE XXII

*6-n-propyl-N-ethyl-3-piperidyldiphenylcarbinol*

Ethyl 6-n-propylnicotinate is treated with ethyl p-toluenesulfonate and the resulting quaternary salt is then carried through the series of reactions shown in Example I. The carbinol of this example can also be obtained in better yield by the use of phenyllithium instead of the conventional phenylmagnesium bromide.

EXAMPLE XXIII

*6-n-propyl-N-ethyl-3-benzhydrylidenepiperidine*

From the carbinol of the previous example by the procedure of Example IV, B. P. 169–172° C./1.5 mm.

EXAMPLE XXIV

*6 - n - propyl - N - ethyl - 3 - benzhydrylidenepiperidine hydrochloride*

From the free amine of the previous example and hydrogen chloride in anhydrous ether, the hydrochloride of this example is obtained as a white crystalline solid after recrystallization from ether-alcohol mixture.

EXAMPLE XXV

*6-isobutyl-N-methyl-3-piperidyldiphenylcarbinol*

Ethyl 6-isobutyl-2-hydroxynicotinate (J. A. C. S., 73, 1368 (1951)) is converted to the corresponding 2-chloro compound with phosphorous oxychloride and phosphorous pentachloride. Treatment of the latter with palladium-on-charcoal catalyst in alcholic hydrogen chloride with hydrogen yields the ethyl 6-isobutylnicotinate. Formation of the methyl quaternary, reduction with platinum oxide and reaction with phenyllithium in accordance with the procedure of Example XXII yields the carbinol of this example.

EXAMPLE XXVI

*6-isobutyl-N-methyl-3-benzhydrylidinepiperidine*

From the carbinol of the previous example with sulfuric acid in accordance with Example IV, B. P. 173–177° C./1.5 mm.

EXAMPLE XXVII

*6 - isobutyl - N.N - dimethyl - 3 - benzhydrylidinepiperidinium methyl sulfate*

From the free amine of the previous example in dimethyl sulfate in benzene solution.

EXAMPLE XXVIII

*6-isobutyl-N-ethyl-3-benzhydrylidinepiperidine*

The requisite carbinol is prepared from ethyl 6-isobutyl-N-ethylnipecotate by the procedures of Examples I and XXII. Dehydration of this carbinol with sulfuric acid in accordance with the instructions of Example IV yields the free amine, B. P. 178–181° C./1.5 mm.

EXAMPLE XXIX

*6-isobutyl-N-ethyl-3-benzhydrylidinepiperidine citrate*

From the free amine of the previous example and anhydrous citric acid in absolute alcohol, this salt is obtained as a white crystalline compound.

EXAMPLE XXX

*6-isobutyl-N-isopropyl-3-benzhydrylidinepiperidine*

The carbinol is prepared by the procedures of Examples I and XXII from ethyl 6-isobutyl-N-isopropylnipecotate. Dehydration of the carbinol with sulfuric acid as described in Example IV yields the free base as a viscous, yellow oil, B. P. 182–185° C./2 mm.

EXAMPLE XXXI

*6 - isobutyl - N - ethyl - N - isopropyl - 3 - benzhydrylidinepiperidinium bromide*

From the free base of the previous example and ethyl bromide in anhydrous benzene, one obtains the quaternary of this example as a pale yellow crystalline solid.

EXAMPLE XXXII

*4-methyl-N-methyl-3-piperidyldiphenylcarbinol*

Ethyl 4-methylnicotinate Ann., 347, 215) is converted to the corresponding nipecotate by the procedure of Example I. Treatment of this reduced acid with phenylmagnesium bromide yields the carbinol of this example as a white crystalline solid after recrystallization from ethanol.

EXAMPLE XXXIII

*4-methyl-N-methyl-3-benzhydrylidinepiperidine*

From the carbinol of the previous example with sulfuric acid in accordance with the procedure of Example IV, B. P. 157–161° C./1 mm.

EXAMPLE XXXIV

*4 - methyl - N - methyl - 3 - benzhydrylidinepiperidine hydrobromide*

From the free amine of the previous example and hydrogen bromide in ether solution.

EXAMPLE XXXV

*4 - methyl - N - methyl - 3 - benzhydrylidinepiperidine tartrate*

From the free amine of Example XXXIII and tartaric acid in alcohol, this tartrate is obtained as a white crystalline compound after recrystallization from ether-alcohol mixture.

EXAMPLE XXXVI

*4-ethyl-N-methyl-3-benzhydrylidinepiperidine*

The requisite intermediate, 4-ethylnicotinic acid (Ber., 35, 1363) is carried through the series of transformations shown in Examples I and XXII. The carbinol, on treatment with 60% sulfuric acid as described in Example IV, gives the unsaturated amine as a yellowish oil, B. P. 163–166° C./1.5 mm.

EXAMPLE XXXVII

*4 - ethyl - N - methyl - 3 - benzhydrylidinepiperidine citrate*

Refluxing in alcoholic solution of the free amine of the previous example and anhydrous citric acid gives the citrate of this example as a white to pale yellow crystalline solid.

EXAMPLE XXXVIII

*2,4-dimethyl-N-methyl-3-benzhydrylidinepiperidine*

Ethyl 2,4-dimethylnicotinate (Ber., 18, 2022) is carried through the series of transformations shown in Examples I and XXII to yield the 2,4-dimethyl-N-methyl-3-piperidyldiphenylcarbinol. Dehydration of the carbinol with 60% sulfuric acid as described in Example IV yields the unsaturated amine boiling at 165–168° C./1.5 mm.

EXAMPLE XXXIX

*2,4 - dimethyl - N - ethyl - N - methyl - 3 - benzhydrylidinepiperidinium bromide*

From the free amine of the previous example and ethyl bromide in alcoholic solution, there is obtained this quaternary salt as a white crystalline solid after recrystallization from alcohol-ether mixture.

EXAMPLE XL

*2,6-dimethyl-N-methyl-3-benzhydrylidinepiperidine*

Ethyl 2,6-dimethylnicotinate (Ber., 19, 1307) is quaternized with methyl p-toluenesulfonate and the crude quaternary directly reduced with platinum oxide in alcoholic solution. The so-obtained ethyl 2,6-dimethyl-N-methyl-nipecotate is then converted to the diphenylcarbinol compound by the procedure of Example I, which on dehydration with sulfuric acid as described in Example IV yields the unsaturated amine of this example as a yellow, viscous oil boiling at 152–157° C./1 mm.

EXAMPLE XLI

*2,6-dimethyl-N,N-dimethyl-3-benzhydrylidinepiperidinium iodide*

From the free base of the previous example and methyl iodide, M. P. 229–230° C.

EXAMPLE XLII

*2,6-dimethyl-N-isopropyl-3-benzhydrylidinepiperidine*

By the procedure of Example XL substituting isopropyl p-toluenesulfonate for methyl p-toluenesulfonate, B. P. 155–159° C./1 mm.

EXAMPLE XLIII

*2,6-dimethyl-N-isopropyl-3-benzhydrylidinepiperidine succinate*

From the free amine of the previous example and succinic acid in anhydrous alcohol solution, the salt of this example is obtained as a white crystalline compound.

EXAMPLE XLIV

*5,6-dimethyl-N-methyl-3-benzhydrylidinepiperidine*

Ethyl 5,6-dimethyl-2-hydroxynicotinate is converted to the 2-chloro compound as outlined in Example XXV. The halogen is then removed with hydrogen using a palladium-on-charcoal catalyst and the resulting ethyl 5,6-dimethylnicotinate is carried through the series of reactions shown in Example I to yield the 5,6-dimethyl-N-methyl-3-piperidyldiphenylcarbinol. This carbinol on dehydration with 60% sulfuric acid as described in Example IV gives the unsaturated amine, B. P. 164–169° C./1.5 mm.

EXAMPLE XLV

*2-methyl-N-methyl-3-benzhydrylidinepiperidine*

Ethyl 2-methylnipecotate (U. S. Patent 2,585,210) is methylated and reacted with phenyllithium to yield the corresponding diphenylcarbinol, M. P. 161–162° C. This carbinol on dehydration with either 60% sulfuric acid or 48% hydrobromic acid yields the amine of this example as a viscous, yellowish oil, B. P. 160–165° C./1 mm.

EXAMPLE XLVI

*2-methyl-N-methyl-3-benzhydrylidinepiperidine hydrochloride*

From the amine of the previous example and hydrogen chloride in ether solution followed by recrystallization from alcohol-ether mixture of the hydrochloride.

EXAMPLE XLVII

*5-methyl-N-methyl-3-benzhydrylidinepiperidine*

5-methylnicotinic acid (Ber., m 23, 1111) is esterified, quaternized, reduced and then treated with phenyllithium as described in Example I to yield the substituted 3-pyridyldiphenylcarbinol. Treatment of this carbinol with potassium bisulfate at 150–190° gives the unsaturated amine boiling at 156–161° C./1.5 mm.

EXAMPLE XLVIII

*4-methyl-5-ethyl-N-methyl-3-benzhydrylidinepiperidine*

Ethyl-4-methyl-5-ethylnicotinate is prepared from 4-methyl-5-ethyl-2,6-dihydroxynicotinonitrile (Helv. Chim. Acta, 2, 338 (1919)) by treatment with phosphorous oxychloride and phosphorous pentachloride, reduction, dehalogenation of the 2,6-dichloro compound with palladium on barium carbonate catalyst, followed by hydrolysis of the nitrile and esterification of the resulting acid. The ester so obtained is then quaternized, the quaternary reduced and the substituted nipecotate is then treated with phenyllithium to give the 4-methyl-5-ethyl-N-methyl-3-piperidyldiphenylcarbinol. The unsaturated amine is obtained from this carbinol by dehydration with 60% sulfuric acid, B. P. 167–170° C./1–2 mm.

EXAMPLE XLIX

*4-methyl-5-ethyl-N-methyl-3-benzhydrylidinepiperidine hydrochloride*

From the free amine of the previous example and hydrogen chloride in ether solution.

EXAMPLE L

*4-methyl-5-ethyl-N-methyl-3-benzhydrylpiperidine citrate*

Reduction of the unsaturated amine of the previous example by the procedure of Example IX yields the benzhydryl derivative, which on treatment with anhydrous citric acid in absolute alcohol gives the citrate as a white crystalline compound. The citrate may be recrystallized from ethanol.

EXAMPLE LI

*4,6-dimethyl-N-methyl-3-benzhydrylidinepiperidine*

Ethyl 4,6-dimethyl-2-hydroxynicotinate (Ber., 35, 2390 (1902)) is converted to ethyl 4,6-dimethylnicotinate by replacement of the hydroxy group with chlorine followed by reductive dehalogenation as described in the previous examples. The reduced ester is then reacted with phenyllithium to give the diphenylcarbinol compound, which without isolation is dehydrated to the benzylidene substance of this example, B. P. 152–154° C./1.5 mm.

EXAMPLE LII

*1-phenyl-1-(6-methyl-N-methyl-3-piperidyl)butanol-1*

The intermediate, 6-methyl-N-methyl-3-benzoylpiperidine is prepared as follows: A solution of 20 g. of ethyl 6-methyl-N-methylnipecotate and 100 ml. of concentrated hydrochloric acid is heated on the steam bath for six hours. The solution is concentrated to dryness and the solid residue of 6-methyl-N-methylnipecotic acid hydrochloride dried in a vacuum dessicator. The dry acid hydrochloride is converted to the acid chloride with thionyl chloride, the excess thionyl chloride removed and the crude acid chloride suspended in dry benzene. With stirring, granular aluminum chloride is added in portions and the resulting mixture is refluxed for 12 hours. The reaction mixture is poured on dilute hydrochloric acid, the acid layer separated, made basic with 50% sodium hydroxide and the resulting oil ether extracted. The ether extracts are dried, concentrated and the residual oil fractionated, B. P. 135–138° C./1 mm.

To a solution of n-propyllithium prepared from 25 g. of n-propylbromide and 2.8 g. of lithium shot in dry ether, there is added 22 g. of 6-methyl-N-methyl-3-benzoylpiperidine. The reaction mixture is refluxed and stirred for 10 hours. The reaction is worked up in the same manner as Example I to obtain the crude carbinol, M. P. 127–128° C.

EXAMPLE LIII

*1-phenyl-1-(6-methyl-N-methyl-3-piperidylidene)-butane*

The crude carbinol is dehydrated in the usual manner with 60% sulfuric acid and the unsaturated amine obtained as a viscous yellow oil, B. P. 141–144° C./2 mm.

EXAMPLE LIV

*1-phenyl-1-(6-methyl-N-methyl-N-ethyl-3-piperidylidene)butane bromide*

Refluxing a mixture of the free base of the previous example with ethyl bromide yields the quaternary salt of this example as a white crystalline solid.

EXAMPLE LV

*1-p-chlorophenyl-1-(6-methyl-N-methyl-3-piperidylidene)butane*

The requisite intermediate, 1-p-chlorophenyl-1-(6-methyl-N-methyl-3-piperidyl)butanol-1 is prepared by substituting chlorobenzene for benzene in Example LII. The crude carbinol without isolation is dehydrated with 60% sulfuric acid to give the unsaturated amine, B. P. 148–151° C./2 mm.

EXAMPLE LVI

*1-p-methoxyphenyl-1-(6-methyl-N-methyl-3-piperidylidene)butane*

The intermediate, 1-p-methoxyphenyl-1-(6-methyl-N-methyl-3-piperidyl)butanol-1, is prepared by substituting anisole for benzene in Example LII. Dehydration of the carbinol with sulfuric acid as described in Example I yields the olefin, B. P. 149–153° C./1.5 mm.

EXAMPLE LVII

*6-methyl-N-methyl-3-piperidylphenyl-2-thienylcarbinol*

Substituting 2-thienyllithium for phenyllithium in Example LII, there is obtained the carbinol of this example as a viscous yellow oil.

EXAMPLE LVIII

*2,4,6-trimethyl-N-methyl-3-benzhydrylidenepiperidine*

Ethyl 2,4,6-trimethylnicotinate (Ann., 215, 1 (1882)) is quaternized, reduced and the resulting nipecotate (B. P. 99–105° C./5 mm.) reacted with phenyllithium to give the corresponding 3-piperidyldiphenylcarbinol. Dehydration of the carbinol by the procedure of Example IV gives the unsaturated amine, B. P. 169–173° C./0.5 mm.

EXAMPLE LIX

*3-ethyl-N-methyl-4-benzhydrylidenepiperidine*

3-ethylisonicotinic acid (Ber., 35, 1352 (1902)) is transformed by the procedures described in the previous examples into the 3-ethylisonipecotic acid. Esterification of the latter, followed by reaction with phenyllithium gives the diphenylcarbinol, which without isolation is dehydrated with 60% sulfuric acid as described in Example IV. The free base is obtained as a viscous yellow oil boiling at 160–164° C./1.5 mm.

EXAMPLE LX

*3-ethyl-N-methyl-N-isopropyl-4-benzhydrylidenepiperidinium chloride*

From the free base of the previous example in isopropyl chloride in ether solution the quaternary is obtained as a white crystalline solid which may be recrystallized from a mixture of alcohol-ether.

EXAMPLE LXI

*4,6-dimethyl-5-ethyl-N-methyl-3-benzhydrylidenepiperidine*

4,6-dimethyl-5-ethyl-3-cyano-2-pyridone (J. A. C. S., 70, 3713) is converted to the 2-chloro compound, the latter dehalogenated with palladium barium carbonate catalyst to 4,6-dimethyl-5-ethyl-3-cyanopyridine, which on hydrolysis, followed by esterification gives the 4,6-dimethyl-5-ethylnicotinic acid. Treatment with methyl p-toluenesulfonate reduction and reaction with phenyllithium or phenylmagnesium bromide as described in Example I yields the 4,6-dimethyl-4-ethyl-N-methyl-3-piperidyldiphenylcarbinol. The crude carbinol is then dehydrated with 60% sulfuric acid as described in Example IV; the unsaturated amine boiling at 167–171° C./1 mm.

EXAMPLE LXII

*4,6-dimethyl-5-ethyl-N-methyl-N-isopropyl-3-benzhydrylidenepiperidinium bromide*

From the free amine of the previous example and isopropyl bromide in ether solution the quaternary is obtained as a white crystalline solid, recrystallizable from alcohol-ether mixture.

EXAMPLE LXIII

*Phenyl-Δ¹-cyclohexenyl-6-methyl-N-methyl-piperidylidenemethane*

The intermediate, 6-methyl-N-methyl-3-benzoylpiperidine, prepared as in Example LII, is reacted with Δ¹-cyclohexenyl chloride via the lithium derivative. The resulting carbinol is dehydrated at 175–185° with potassium bisulfate and the doubly unsaturated amine thereby obtained is a yellowish oil, B. P. 160–162° C./1–2 mm.

EXAMPLE LXIV

*Phenylbenzyl-6-methyl-N-methyl-3-piperidylidenemethane*

The intermediate, 6-methyl-N-methyl-3-benzoylpiperidine, described in Example LII, is treated with one equivalent of benzylmagnesium chloride. The resulting carbinol, without purification, is dehydrated with sulfuric acid as described in Example IV and the unsaturated amine is obtained as a yellowish oil, B. P. 162–165° C./1–2 mm.

EXAMPLE LXV

*6-propyl-N-methyl-4-benzhydrylidenepiperidine*

Ethyl butyrylpyruvate (J. C. S., 81, 1490) is condensed with cyanoacetamide and diethylamine in alcohol to yield ethyl 6-propylisonicotinate by the same series of transformations used to prepare 6-ethylisonicotinate (J. O. C., 6, 70 (1941)). 6-propyl-N-methyl-4-benzhydrylidenepiperidine is then prepared from 6-propylisonicotinate according to the procedure described in Examples I and IV, B. P. 169–172° C./1.5 mm.

EXAMPLE LXVI

*2,6-dimethyl-N-ethyl-3-benzhydrylidenepiperidine*

This unsaturated amine is obtained by the procedure of Example XL substituting for methyl p-toluene sulfonate, ethyl p-toluene sulfonate. The amine is a somewhat viscous yellowish liquid boiling at 156–158° C./1 mm.

EXAMPLE LXVII

*2-methyl-N,N-dimethyl-3-benzhydrylidenepiperidinium iodide*

From the unsaturated amine of Example XLV and methyl iodide, M. P. 259–260° C.

EXAMPLE LXVIII

*6-methyl-N-methyl-4-piperidyldiphenylcarbinol*

Ethyl acetopyruvate and cyanoacetamide are condensed by the procedure described in Example LXV and yields ethyl-6-methylnicotinate. Conversion of this substance to the compound of this example proceeds by the series of transformations described in Example I. The carbinol is obtained as a white, crystalline compound melting at 172–173° C. after recrystallization from benzene-petroleum ether.

EXAMPLE LXIX

*6-methyl-N-methyl-4-benzhydrylidenepiperidine*

Dehydration of the carbinol of the previous example with sulfuric acid gives the unsaturated amine of this example, B. P. 151–153° C./0.5 mm.

EXAMPLE LXX

*6-methyl-N,N-dimethyl-4-benzhydrylidenepiperidinium methyl sulfate*

The free amine of the previous example with dimethyl sulfate in benzene solution yields this quaternary salt, M. P. 181–182° C. after recrystallization from methanol-ether.

EXAMPLE LXXI

*2,6-dimethyl-N-methyl-4-benzhydrylidinepiperidine*

Ethyl-2,6-dimethylisonicotinate is carried through the series of transformations described in Example I to yield the appropriately substituted diphenyl carbinol. The latter, on dehydration with sulfuric acid as described in the previous examples, gives the unsaturated amine of this

EXAMPLE LXXII

*2,6-dimethyl-N,N-dimethyl-4-benzhydrylidenepiperidinium methyl sulfate*

The free base of the previous example, on treatment with dimethylsulfate in benzene solution, yields the quaternary salt as a white crystalline solid.

EXAMPLE LXXIII

*6-isopropyl-N-methyl-3-benzhydrylidenepiperidine*

Ethyl-6-isopropyl-2-hydroxynicotinate (prepared by the procedure described in JACS 73, 1368 (1951) from methylisopropyl ketone) is converted to the corresponding 2-chloro compound with phosphorous oxychloride and phosphorous pentachloride and dehalogenated with palladium-on-carbon. The resulting ethyl-6-isopropyl-nicotinate is converted to the unsaturated amine of this example by the procedures of Example XXV and XXVI, B. P. 169–173° C.

EXAMPLE LXXIV

*2-ethyl-N-methyl-3-benzhydrylidenepiperidine*

Ethyl-2-ethylnipecotate is prepared by a method analogous to that described in U. S. Patent 2,585,210. Ethyl-(2-cyanoethyl) propionylacetate is reduced and cyclized to ethyl-2-ethylnipecotate, methylated with formaldehyde and palladium-on-carbon to yield ethyl-2-ethyl-N-methyl-nipecotate and then by the series of transformations of Example XLV converted to the unsaturated amine of this example, B. P. 163–167° C./1 mm.

EXAMPLE LXXV

*2-isopropyl-N-methyl-3-benzhydrylidenepiperidine*

The reduction and cyclization of ethyl-(2-cyanoethyl) isobutyrylacetate yields ethyl - 2 - isopropylnipecotate. Methylation gives the N-methyl derivative and the latter by the process of Example XLV is converted to the unsaturated amine of this example, B. P. 172–176° C./1 mm.

EXAMPLE LXXVI

*2,6-diethyl-N-methyl-3-benzhydrylidenepiperidine*

Ethyl-2,6-diethylnicotinate: This intermediate is prepared in a manner analogous to that employed for ethyl-2,6-dimethylnicotinate (Ber. 35, 3156 (1902)); Annalen 366, 324 (190). Ethyl propionylacetate is reacted with ammonia to yield ethyl-β-amino-β-ethyl acrylate, the latter cyclized with phosphorous oxychloride and the resulting ethyl-2,6-diethyl-4-chloronicotinate dehalogenated with palladium-on-charcoal in acid solution. The ethyl-2,6-diethyl nicotinate is converted to the corresponding diphenylcarbinol by the transformations described in Example XL and dehydrated with sulfuric acid as described in Example IV to yield the unsaturated amine as a viscous yellow oil, B. P. 164–167° C./1 mm.

EXAMPLE LXXVII

*2,6-diethyl-N-methyl-3-benzhydrylidenepiperidine hydrochloride*

From the amine of the previous example and hydrogen chloride in ether solution, the hydrochloride, after recrystallization from alcohol-ether is obtained as a white crystalline compound.

EXAMPLE LXXVIII

*2,6-diethyl-N-ethyl-3-benzhydrylidenepiperidine*

By the procedure of Example LXXVI substituting ethyl-p-toluenesulfonate for methyl-p-toluenesulfonate, B. P. 168–171° C./1 mm.

example as a white crystalline solid, M. P. 111–112° C. after recrystallization from petroleum ether.

EXAMPLE LXXIX

*2,6-diethyl-N,N-diethyl-3-benzhydrylidene piperidinium bromide*

By reacting the amine of the previous example with ethyl bromide, this quaternary salt is obtained as a white crystalline compound after recrystallization from alcohol-ether.

EXAMPLE LXXX

*2,6-diisopropyl-N-methyl-3-benzhydrylidene piperidine*

By the procedure of Example LXXVI, substituting ethyl isobutyrylacetate for ethyl propionylacetate, the symmetrical unsaturated amine is obtained as a viscous yellow oil, B. P. 170–174° C./1 mm.

EXAMPLE LXXXI

*6,6-dimethyl-N-methyl-3-benzhydrylidenepiperidine*

The intermediate, N-methyl-N-2-carbethoxyethyl-β-valine ester is prepared as follows: To a cold solution of 145 g. of β-valine ethyl ester (Monatch. 51, 253 (1929)) in one liter of absolute ethanol is added slowly with stirring 100 g. of ethyl acrylate. After standing two days, the mixture is distilled and N-2-carbethoxyethyl-β-valine ester is obtained as an oil, B. P. 135–138° C./3 mm. The latter is dissolved in methanol and reduced with formaldehyde, palladium-on-carbon to yield the diester, B. P. 139–142° C./3 mm.

One hundred grams of N-methyl-N-2-carbethoxyethyl-β-valine ester is cyclized with sodium and xylene (JACS 68, 1239 (1946)) to yield ethyl-6,6-dimethyl-N-methyl-4-keto-nipecotate, the latter reduced with platinum oxide and hydrogen in absolute ethanol to the corresponding 4-hydroxy compound and after dehydration with potassium bisulfate at 150° the 6,6-dimethyl arecoline is reduced with platinum oxide in ethanol to ethyl-6,6-dimethylnipecotate, B. P. 105–107° C./8 mm. This ester after N-methylation is treated with phenyl lithium in accordance with the procedure of Example I and yields the crude diphenylcarbinol, which, without purification, is dehydrated with 60% sulfuric acid to the unsaturated amine. This substance is a somewhat viscous, yellowish oil boiling at 167–171° C./1 mm.

EXAMPLE LXXXII

*2,6,6-trimethyl-N-methyl-3-benzhydrylidenepiperidine*

The intermediate, N-methyl-N - 2 - carbethoxypropyl-β-valine ester is prepared as follows: A mixture of 130 g. of ethyl acetoacetate and 145 g. of β-valine ester is heated on the steam bath overnight, alcohol added and the solution reduced with platinum oxide, hydrogen and formaldehyde to give the diester, B. P. 134–138° C./2 mm.

The diester, N-methyl-N-2-carbethoxypropyl-β-valine ester is cyclized with sodium and xylene and by the same series of transformations described in the previous example gives ethyl-2,6,6-trimethyl-N-methylnipecotate.

This trimethyl ester is converted to the corresponding diphenylcarbinol by the series of reaction described in Example I and after dehydration of the carbinol the unsaturated amine boils at 171–174° C./1 mm.

Additional compounds which can be prepared by the procedures of the previous examples are the following:

6-n-propyl-N-isopropyl-3-benzhydrylidenepiperidine
6-n-propyl-N-butyl-3-benzhydrylidenepiperidine
6-isopropyl-N-methyl-3-benzhydrylidenepiperidine
6-isopropyl-N-methyl-3-piperidyldiphenylcarbinol
6-isopropyl-N-methyl-3-benzhydrylpiperidine
6-isopropyl-N-ethyl-3-piperidyldiphenylcarbinol
6-isoproply-N-ethyl-3-benzhydrylidenepiperidine
6-isopropyl-N-ethyl-3-benzhydrylpiperidine
4-methyl-N-ethyl-3-benzhydrylidenepiperidine
2,4-dimethyl-N-ethyl-3-piperidyldiphenylcarbinol
2,4-dimethyl-N-ethyl-3-benzhydrylidenepiperidine
2,4-dimethyl-N-isopropyl-3-piperidyldiphenylcarbinol 2,4-dimethyl-N-isopropyl-3-benzhydrylpiperidine
2,6-dimethyl-N-isoproply-3-piperidyldiphenylcarbinol
2,6-dimethyl-N-isoproply-3-benzhydrylidenepiperidine
2,6-dimethyl-N-isopropyl-3-benzhydrylpiperidine
5,6-dimethyl-N-isopropyl-3-benzhydrylidenepiperidine
2-methyl-N-ethyl-3-piperidyldiphenylcarbinol
2-methyl-N-ethyl-3-benzhydrylidenepiperidine
2-methyl-N-isopropyl-3-benzhydrylidenepiperidine
4,6-dimethyl-N-ethyl-3-benzhydrylidenepiperidine
1 - p - chlorophenyl-1-(6-methyl-N-isopropyl-3-piperidyl) butanol-1
1 - p - chlorophenyl-1-(6-methyl-N-isopropyl-3-piperidylidene)butane
1-p-methoxyphenyl-1-(6-methyl-N-ethyl-3-piperidylidene)butane
6 - methyl - N - methyl-3-piperidylidenephenyl-2-thiazolylmethane
6 - methyl - N-methyl-3-piperidylidenephenyl-2-pyrimidylmethane
6-methyl-N-ethyl-4-benzhydrylidenepiperidine
6-methyl-N-isopropyl-4-benzhydrylidenepiperidine
6-ethyl-N-isopropyl-4-benzhydrylidenepiperidine
3-methyl-N-isoproply-4-benzhydrylidenepiperidine
2,4,6-trimethyl-N-isopropyl-3-benzhydrylidenepiperidine
Phenyl - p-methylphenyl-(6-methyl-N-methyl-3-piperidylidene)methane
Phenyl - p - methylphenyl-(2,6-dimethyl-N-methyl-3-piperidylidene)methane This application is a continuation-in-part of application Serial No. 242,438, filed August 17, 1951, by Nathan Sperber, Frank Villani and Domenick Papa which was a continuation-in-part of application Serial No. 199,364, now abandoned, filed December 5, 1950, by Nathan Sperber, Frank Villani and Domenick Papa.

We claim:
1. Piperidylidene compounds of the group consisting of bases of the general formula

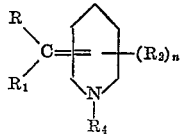

wherein R and $R_1$ are members of the group consisting of phenyl, chlorophenyl, methoxyphenyl, benzyl, cyclohexenyl and lower alkyl, $R_2$ is a lower alkyl group; $n$ is an integer from 1 to 3, $R_4$ is selected from the group consisting of hydrogen and lower alkyl groups, and the quaternary and acid addition salts thereof.

2. Piperidylidene compounds of the class consisting of bases of the general formula

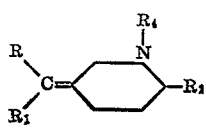

wherein R and $R_1$ are phenyl and $R_2$ and $R_4$ are lower alkyl groups and the quartenary salts and acid addition salts thereof.

3. Piperidylidene compounds of the class consisting of bases of the general formula

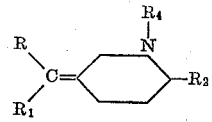

wherein R is a phenyl and $R_1$, $R_2$ and $R_4$ are lower alkyl groups and the quaternary salts and acid addition salts thereof.

4. Piperidylidene compounds of the class consisting of bases of the general formula

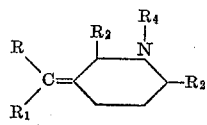

wherein R and $R_1$ are phenyl and $R_2$ and $R_4$ are lower alkyl groups and the quaternary salts and acid addition salts thereof.

5. Piperidylidene compounds of the group consisting of the bases of the general formula

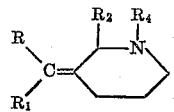

wherein R and $R_1$ are phenyl and $R_2$ and $R_4$ are lower alkyl groups and the quaternary salts and acid addition salts thereof.

6. 2,6-dimethyl-N-methyl-3-benzhydrylidenepiperidine.
7. 6-methyl-N-methyl-3-benzhydrylidenepiperidino.
8. 1 - phenyl - 1-(6-methyl-N-methyl-3-piperidylidene)-butane.
9. 2-methyl-N-methyl-3-benzhydrylidenepiperidine.
10. 2,6-dimethyl-N,N-dimethyl-3-benzhydrilidenepiperidinium iodide.

References Cited in the file of this patent
UNITED STATES PATENTS

| | | |
|---|---|---|
| 2,599,364 | Berger et al. | June 3, 1952 |
| 2,599,365 | Berger et al. | June 3, 1952 |
| 2,604,473 | Sperber et al. | July 22, 1952 |